United States Patent [19]

Nedila

[11] 4,187,665
[45] Feb. 12, 1980

[54] DEVICE FOR USE IN PICKING BERRIES

[76] Inventor: Walter Nedila, Box 63, MacDowall, Saskatchewan, Canada, S0K 2S0

[21] Appl. No.: 875,162

[22] Filed: Feb. 6, 1978

[30] Foreign Application Priority Data

Jun. 10, 1977 [CA] Canada .................................. 280252

[51] Int. Cl.² .......................................... A01D 46/00
[52] U.S. Cl. ................................................. 56/330
[58] Field of Search .................................. 56/330, 127

[56] References Cited

U.S. PATENT DOCUMENTS

| | | | |
|---|---|---|---|
| 1,038,302 | 9/1912 | Dale | 56/330 |
| 1,283,526 | 11/1918 | Kaye | 56/330 |
| 1,316,265 | 9/1919 | Bodlak | 56/330 |
| 1,353,172 | 9/1920 | Mahtes | 56/330 |
| 1,406,874 | 2/1922 | Kaye | 56/330 |
| 1,569,690 | 1/1926 | Wainio | 56/330 |
| 1,806,058 | 5/1931 | Holmgren | 56/330 |

FOREIGN PATENT DOCUMENTS 87290 7/1895 Fed. Rep. of Germany ............. 56/330
69042 3/1945 Norway ..................................... 56/330

Primary Examiner—Russell R. Kinsey
Assistant Examiner—Paul J. Hirsch
Attorney, Agent, or Firm—Stanley E. Johnson

[57] ABSTRACT

A berry picking device consisting of a container having an open front with a scoop-like portion projecting forwardly therefrom. The scoop-like portion has a bottom wall formed at least in part by a plurality of spaced-apart tines for stripping berries from branches of shrubs, trees or the like carrying the same. The berries stripped from their branches pass over the tines through a screen into a berry collecting compartment. The screen is a mesh or plurality of rods spaced apart from one another with appropriate opening allowing berries to pass therethrough and hold back the loose branches and other debris separating the same from the berries. A portion of the forwardly projecting tines pass over another compartment and the spacing between the tines is such that small berries pass therethrough into the compartment thus separating the collected berries into two different sizes.

1 Claim, 2 Drawing Figures

[4,187,665]

DEVICE FOR USE IN PICKING BERRIES

FIELD OF INVENTION

This invention relates to a device for use in picking berries.

BACKGROUND OF INVENTION

A number of proposals disclose different hand carried devices for use in picking berries overcoming the slow and tedious job of picking them individually by hand.

In general, the prior art devices consist of an open front container having tines projecting forwardly therefrom which can be inserted into a cluster of berries. By handpulling the device along the branches, the tines strip the berries therefrom after which they pass through the open front into a compartment that retains the berries. While this speeds up the picking operation, debris consisting of small branches and/or leaves are also collected along with the berries. When the berries are dumped from the compartment, a further sorting job is thus required to separate the berries from the debris.

An object of the present invention is to provide a device of the foregoing general type but with further means therein to separate the debris from the berries before the latter enter into the storage compartment of the container.

SUMMARY OF INVENTION

Accordingly, there is provided in accordance with the present invention a device for use in picking berries comprising a container having an open front with a scoop-like portion projecting forwardly therefrom, said scoop-like portion having a bottom wall consisting at least in part of a plurality of spaced apart tines for stripping berries from branches of shrubs or trees carrying the same, a compartment in said container for retaining the berries stripped from the branches and a screen, interposed between the tined portion and said compartment, through which the berries must pass into the compartment, said screen having openings of appropriate size allowing the berries to pass therethrough but preventing at least a major portion of leaves, branches and other debris from passing therethrough into said compartment.

BRIEF DESCRIPTION OF DRAWINGS

The invention is illustrated by way of example in the accompanying drawings wherein.

DETAILED DESCRIPTION

Figure 1:
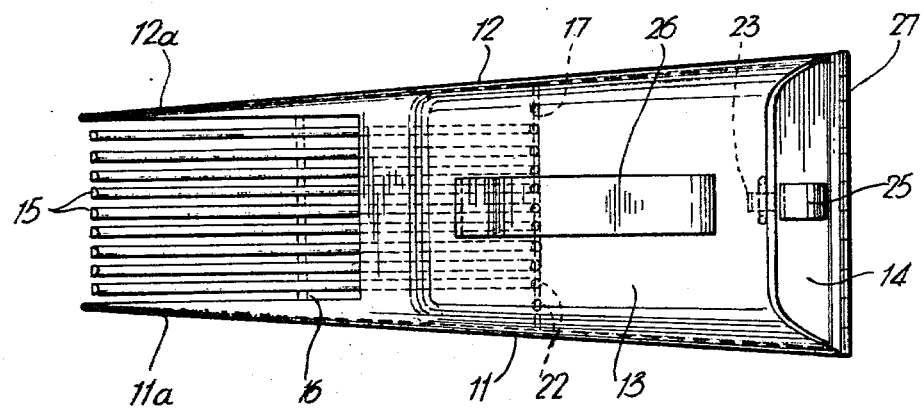
FIG. 1 is a top plan view of a berry picking device constructed in accordance with the present invention.
Figure 2:
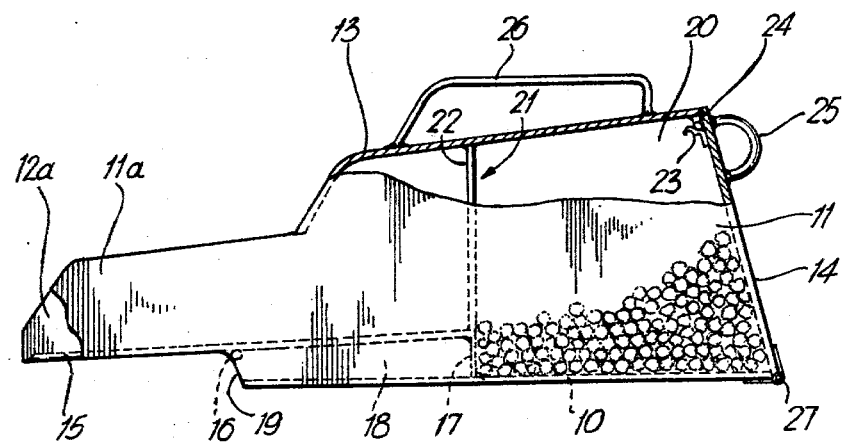
FIG. 2 is a side elevational view of FIG. 1.

Referring now to the drawings, there is illustrated a berry picking device consisting of a container having a bottom wall 10, a pair of spaced apart opposed side walls 11 and 12, a top wall 13, a rear wall 14 and an open front wall. The side walls 11 and 12 have respective forwardly projecting portions 11A and 12A between which are located a plurality of spaced apart parallel rods or tines 15. The tines and forwardly projecting wall portions 11A and 12A provide a scoop-like portion projecting forwardly of the open front wall of the container. The tines 15 are supported on a crossbar 16 attached, as by welding or the like, at opposite ends to the respective side walls 11 and 12. The rods project forwardly from the crossbar 16 and are used to strip berries from the branches of a berry bearing shrub. The rods also project rearwardly from the crossbar 16 and are supported on a flange or bar 17 which extends across the container and is attached to the side walls 11 and 12 and/or bottom wall 10. The portions of the rods between crossbar 16 and flange 17 are spaced from the bottom wall 10 of the container providing therebetween a compartment 18. This compartment may be open at the front end as indicated at 19 or, alternatively, closed by a hinged door or removable cover. The rear portion of the container has a compartment 20 for receiving the berries as they are picked. The compartment 20 is separated from the tined berry picking portion of the device by a screen 21 of appropriate mesh opening to allow the berries to pass therethrough after being stripped from the branches by the tines. The mesh of the sieve or screen 21 however is sufficiently small as to prevent branches and/or leaves larger than the berries from passing therethrough with the result that the berries are cleaned during the picking operation. The sieve or screen 21 may be a mesh type or, alternatively, a plurality of individual bars 22 disposed parallel to one another in spaced apart relation and extending between the top and bottom walls 10 and 13 and/or transversely across the device between walls 11 and 12.

The portions of the rods or tines 15 disposed between the crossbar 16 and flange 17 serve as a further screen separating larger berries from the smaller berries, the latter passing downwardly into the compartment 18. With an open front end 19, the smaller berries are discharged onto the ground during use of the device providing easy pickings for birds or other berry eating wildlife. Should one however wish to collect the small berries, this can readily be accomplished by having a hinged lid or removable cover closing the open end 19 of the compartment 18.

The rear wall 14 is hingedly mounted, as at 27, and retained in a closed position by a spring catch 23 cooperating with an enlargement or lug 24 secured to and projecting from the wall 13. The door has a finger grip handle 25 and by opening the door, the collected clean berries can readily be dumped from the device into a storage or transport container for the berries.

A handle 26 is secured to the top wall of the device and is normally balanced so that the entire device may be readily manipulated by one hand in stripping berries from their branches.

I claim:

1. A device for use in picking berries comprising a container defined by a planar flat bottom wall, a top wall, a pair of opposed side walls, a hingedly mounted rear wall and an open front wall, a handle rigidly secured to said top wall, a scoop-like portion projecting forwardly from said open front wall, said scoop-like portion having side walls provided by extensions of said opposed side walls of the container, a plurality of spaced apart parallel tines disposed in a plane above the bottom wall of the container and extending rearwardly into the container to overlap a portion of said bottom wall, said tines extending forwardly between the extensions of the side walls providing a bottom wall of said scoop-like portion, said latter mentioned bottom wall being in a plane spaced upwardly from the bottom wall of the container, a screen extending across the interior of the container at a position spaced forwardly of the rear wall providing therebetween a compartment for holding berries picked from a shrub by using said tines, said screen being connected to said tines adjacent ends of the latter located in the container and defining a foraminous wall intersecting said tines, said screen having openings of sufficient size to allow berries of a selected maximum size to pass therethrough into said compartment but prevent passage therethrough of at least a major portion of leaves, branches and the like debris picked with the berries and said tines having spacings therebetween less than said selected maximum size.

* * * * *